United States Patent
Chang et al.

(10) Patent No.: US 9,730,081 B2
(45) Date of Patent: Aug. 8, 2017

(54) RAPID AND PRECISE METHODOLOGY FOR MASSIVE SMALL CELL DEPLOYMENT

(71) Applicant: Cisco Technology, Inc., San Jose, CA (US)

(72) Inventors: Che-ming Chang, Cary, NC (US); Jeffrey Riddel, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 381 days.

(21) Appl. No.: 14/010,614

(22) Filed: Aug. 27, 2013

(65) Prior Publication Data

US 2015/0067136 A1 Mar. 5, 2015

(51) Int. Cl.
*H04W 16/24* (2009.01)
*H04W 16/18* (2009.01)
*H04L 12/24* (2006.01)
*H04W 16/32* (2009.01)
*H04W 24/02* (2009.01)

(52) U.S. Cl.
CPC ......... *H04W 16/24* (2013.01); *H04L 41/0866* (2013.01); *H04W 16/18* (2013.01); *H04L 41/0853* (2013.01); *H04L 41/0883* (2013.01); *H04W 16/32* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 8,457,084 B2 * | 6/2013 | Valmikam | H04W 64/003 370/338 |
| 2009/0197634 A1 * | 8/2009 | Sun | H01Q 1/246 455/524 |
| 2009/0251283 A1 * | 10/2009 | Ito | G07C 9/00111 340/5.61 |
| 2010/0017525 A1 * | 1/2010 | Albert | H04L 43/0811 709/229 |
| 2013/0231152 A1 * | 9/2013 | Zimmerman | H01Q 1/246 455/517 |
| 2013/0346871 A1 * | 12/2013 | Ono | H04B 7/10 715/736 |
| 2014/0019254 A1 * | 1/2014 | Reichert | G06Q 30/0267 705/14.64 |
| 2015/0018003 A1 * | 1/2015 | Zhou | H04W 4/043 455/456.1 |

\* cited by examiner

*Primary Examiner* — Jeffrey M Rutkowski
*Assistant Examiner* — Mehedi Aley
(74) *Attorney, Agent, or Firm* — Merchant & Gould P.C.

(57) ABSTRACT

Small cell deployment may be provided. First, access point data may be captured by a technician device from an access point. Next, the access point data may be transmitted from the technician device to a backend server. The technician device may then receive post-check results corresponding to the access point from the backend server. The post-check results may be based on the transmitted access point data.

20 Claims, 4 Drawing Sheets

RAPID AND PRECISE METHODOLOGY FOR MASSIVE SMALL CELL DEPLOYMENT

BACKGROUND

Small cells are low-powered radio access nodes that operate in licensed and unlicensed spectrum that have a range of 10 meters to 1 or 2 kilometers, compared to a mobile macrocell that might have a range of a few tens of kilometers. With mobile operators struggling to support the growth in mobile data traffic, many are using mobile data offloading as a more efficient use of radio spectrum. Small cells are an element of 3G data off-loading, and many mobile network operators see small cells as a way to manage Long Term Evolution (LTE) advanced spectrum more efficiently compared to using just macrocells.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
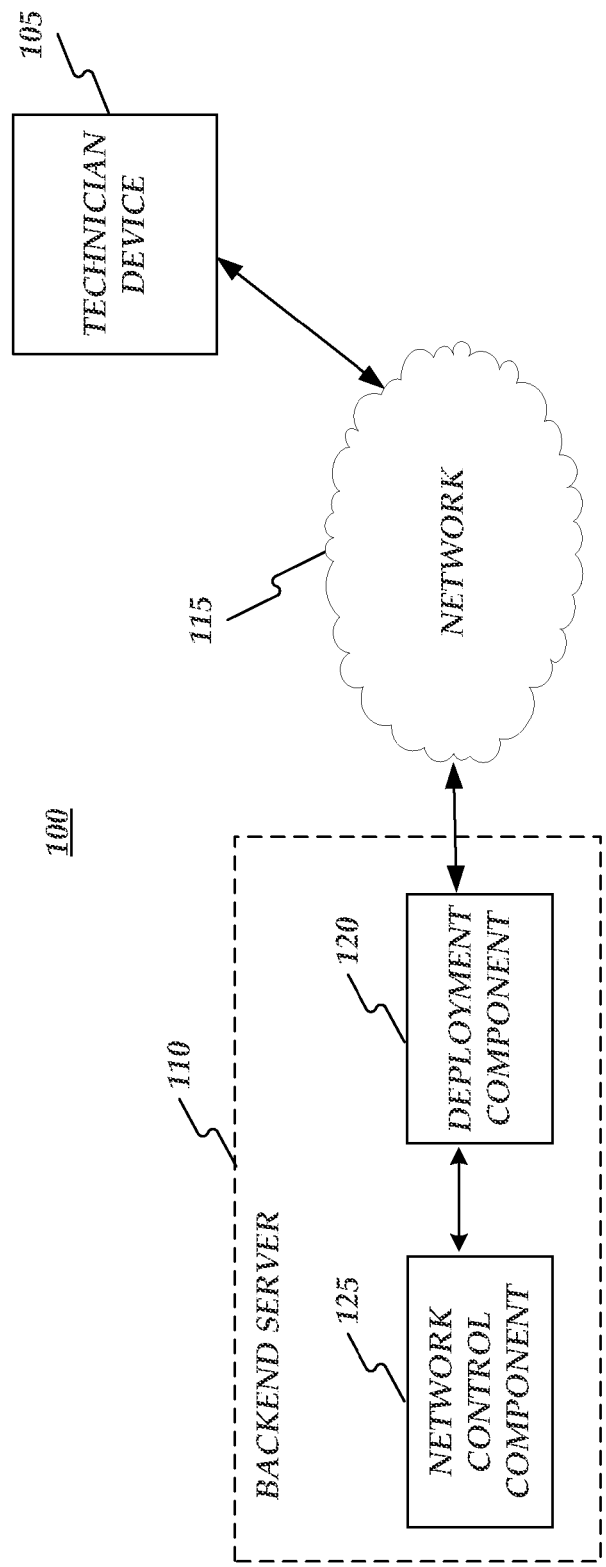
FIG. 1 shows a deployment system.

Small cell deployment may be provided. First, access point data may be captured by a technician device from an access point. Next, the access point data may be transmitted from the technician device to a backend server. The technician device may then receive post-check results corresponding to the access point from the backend server. The post-check results may be based on the transmitted access point data.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Conventional processes for deploying access points (APs) for a small cell (e.g. Wi-Fi) network are cumbersome. As an example, deploying a Wi-Fi network for a golf tournament may be very challenging and labor intensive. Usually, technicians have a short time (e.g. a week) to finish AP installation and to test radio coverage of the installed APs. In conventional processes, APs need to be pre-staged with particular location and Media Access Control (MAC) address information in association with a site survey map of the area covered. For example, deploying APs massively for high density areas in a timely manner may require intensive labor to record MAC addresses, location information, antenna direction, etc. Furthermore, conventional systems may require considerable back and forth between the technicians and network engineers during deployment. Dead on Arrival (DoA) of AP units further complicates matter and may result in upset customers because technicians may need to go back out and reinstall units to replace the defective ones.

Embodiments of the disclosure may automate a significant portion of the AP deployment process that may enable a faster and more accurate schedule. For example, embodiments of the disclosure may provide a methodology to quickly deploy massive amounts of APs in a timely manner by utilizing, for example, a Quick Response (QR) Code, pattern recognition, RFID, or Bluetooth to obtain AP information in combination with an intelligent back-end system. Using QR codes is one cost-effective implementation. Consequently, conventional heavy labor work and error-prone processes may be eliminated.

Moreover, embodiments of the discourse may provide the freedom of AP location to AP MAC address association for wireless AP installations. In addition, embodiments of the disclosure may provide a precise installation and service activation process for massive wireless AP deployments. This may be a key differentiator for customers and may reduce operating expenses (OPEX) in terms of deployment and post installation management. Embodiments of the discourse may relieve service providers of the burdens currently associated with conventionally providing wireless access services and may enable their ability to service any major event in a timely and more efficient manner.

FIG. 1 is a block diagram of a deployment system 100. As shown in FIG. 1, deployment system 100 may include a technician device 105, a backend server 110, and a network 115. Backend server 110 may comprise a deployment component 120 and a network control component 125. Computing device 400 may provide an operating environment for deployment component 120 or network control component 125 as described in greater detail below.

Technician device 105 and backend server 110 may communicate over network 115. Network 115 may comprise any type of network (e.g., the Internet, a hybrid fiber-coaxial (HFC) network, a content delivery network (CDN), etc.) capable of communicating date. Furthermore, technician device 105 and backend server 110 may communicate over any type of network and are not limited to network 115.

Technician device 105 may comprise, but is not limited to, a personal computer, a tablet device, a mobile device, a smart phone, a telephone, a remote control device, a network computer, or other similar microcomputer-based device. Technician device 105 may comprise any type device capable of transmitting, receiving, and processing data. A camera may be provided on technician device 105 thus technician device 105 may also be capable of transmitting, receiving, and processing data corresponding to pictures taken by technician device 105's camera.

Figure 2:
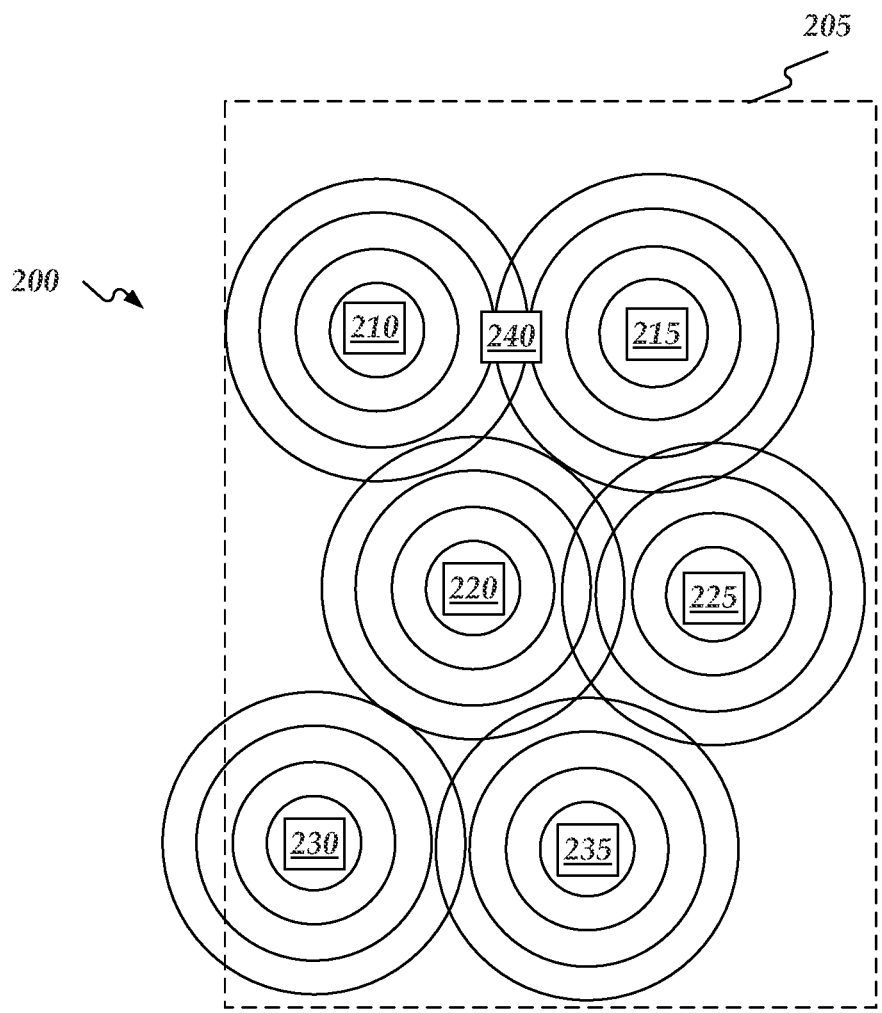
FIG. 2 shows a small cell.

FIG. 2 is a block diagram showing a small cell 200. As shown in FIG. 2, small cell 200 may be deployed within small cell area 205 (e.g. a golf course.) Small cell 200 may comprise a plurality of APs (e.g. a first AP 210, a second AP 215, a third AP 220, a fourth AP 225, a fifth AP, 230, and a sixth AP 235.) The concentric circles around each of the plurality of APs may indicate radio coverage of each of the plurality of APs. A user device 240 may receive Wi-Fi service from small cell 200. User device 240, may comprise, but is not limited to, a set-top box, a digital video recorder, a cable modem, a personal computer, a cellular base station, a personal computer, a tablet device, a mobile device, a smart phone, a telephone, a remote control device, a network computer, or other similar microcomputer-based device.

Figure 3:
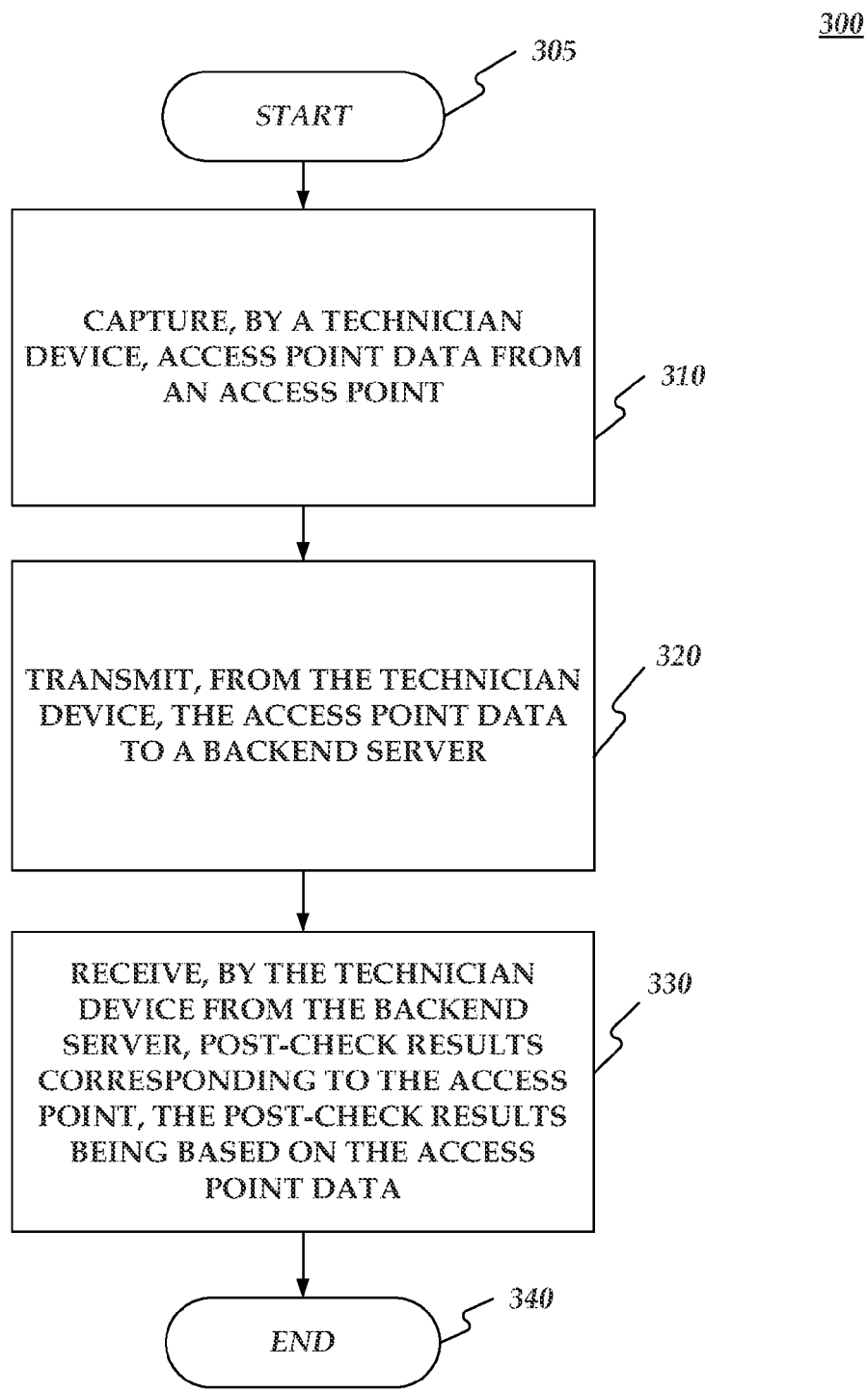
FIG. 3 is a flow chart of a method for providing small cell deployment.

FIG. 3 is a flow chart setting forth the general stages involved in a method 300 consistent with an embodiment of the disclosure for providing small cell deployment. Method 300 may be implemented using technician device 105 and backend server 110. A computing device 400, as described in more detail below with respect to FIG. 4, may provide an operating environment for technician device 105 or backend server 110, for example. Ways to implement the stages of method 300 will be described in greater detail below.

Method 300 may begin at starting block 305 and proceed to stage 310 where technician device 105 may capture access point data from first access point 210. For example, a technician may be deploying the plurality of APs for small cell 200. To start the process, once first AP 210 is installed and powered, the technician may use technician device 105 to scan a bar code or receive a wireless signal from first AP 210 (and/or from an antenna associated with first AP 210) in order to obtain access point data from first access point 210. The bar code may comprise a matrix barcode (e.g. two-dimensional barcode) located on first access point 210. The wireless signal may comprise a Bluetooth signal from first access point 210 or may emanate from a radio-frequency identification (RFID) tag located on first access point 210. Technician device 105 may have a camera and application enabling it to read bar codes or a receiver and application enabling it to obtain Bluetooth or RFID tag information.

The access point data captured by technician device 105 from first AP 210 may comprise a Media Access Control (MAC) address of first AP 210, a serial number of first AP 210, or model information corresponding to first AP 210. Moreover, the access point data may comprise a serial number of an antenna associated with first AP 210 and model information of the antenna associated with first AP 210. Information regarding the antenna may be used latter by backend server 110 to perform a radio coverage calculation for first AP 210.

In addition, the access point data may comprise a picture of first AP 210 and a picture of an antenna installed on first AP 210 captured by technician device 105. From the pictures, an engineer can remotely check how first AP 210 physical looks without re-visiting first AP 210 in person.

Technician device 105 may have Global Positioning System (GPS) capability. Consequently, technician device 105 may capture GPS information corresponding to a location of first access point 210 and include this in the access point data. In addition, the technician may include his name as the technician who installed first access point 210 with the access point data.

From stage 310, where technician device 105 captures the access point data, method 300 may advance to stage 320 where technician device 105 may transmit the access point data to backend server 110. For example, once backend server 110 receives the access point data, it may respond to technician device 105 with a notification that communication is complete. Then an installation post-check may be launched automatically by backend server 110. The post-check may comprise determining that there is a problem with how first AP 210 was deployed. Backend server 110 may perform, but is not limited to, the following tasks:

1. Update a database with the information received;
2. Record all post-check tasks and whether it passed or failed;
3. If any task is failed, notify the proper engineer/manager;
4. Validate the Dynamic Host Configuration Protocol (DHCP) lease established for the AP;
5. Trace route the IP address of the AP;
6. Confirm the IP path reachability with various ping sizes;
7. Start process to interlock connected switches such as Power over Ethernet (PoE);
8. Start logging information and insert into a topology map;
9. Check the area information matches to the switch information;
10. Ensure the AP Control And Provisioning of Wireless Access Points (CAPWAP) tunnel is established with a wireless LAN controller (WLC);
11. Ensure the proper configuration is downloaded from the WLC
12. Ensure the AP is assigned to the proper AP/interface group based on the area information;
13. Start Radio Resource Management (RRM) process if needed;
14. Update the network control component database and map information;
15. Confirm the installation is checked and complete;
16. Notify the technician the task is complete or additional check is require; and
17. Repeat the above or the technician can move on the next AP (e.g. second AP 215).

Once technician device 105 transmits the access point data to backend server 110 in stage 320, method 300 may continue to stage 330 where technician device 105 may receive, from backend server 110, post-check results corresponding to first access point 210. The post-check results may be based on the transmitted access point data. The post-check results may comprise information on how to fix the problem with how first AP 210 was deployed as determined by the post-check. For example, the post-check results may have determined that the antenna was configured incorrectly. Consequently, the post-check results may instruct the technician to adjust the antenna to the proper configuration.

Another problem that could be encountered with first AP 210 may be that it is defective (e.g. dead on arrival (DoA)). If the post-check indicates first AP 210 is DoA, the post-check results may instruct the technician to scan a bar code on a replacing AP and send the access point data of the replacement AP to backend server 110 via network 115. Backend server 110 can confirm that the replacement AP is the correct AP (or incorrect AP) to the technician. Once confirmed, backend server 110 may mark the defective AP as one that should be deleted. Once the replacement AP is installed, the new access point data for the replacement AP may be sent and backend server 110 may duplicate the configuration for the replacement (new) AP and then delete the defective AP from the database. The backend server 110 may also initiate a returned merchandise authorization (RMA) for the defective AP.

Furthermore, backend server 110 (e.g. deployment component 120) may provide progress information relevant to the deployment of small cell 200 to management and indicate the percentage completion per day. As a result, manpower requirement may be adjusted based on the progress information to finish the project in time or earlier than it is expected. Consequently, there may be no surprise to the service provider that is deploying small cell 200 for a major event. Once technician device 105 receives post-check results in stage 330, method 300 may then end at stage 340.

An embodiment consistent with the disclosure may comprise a system for providing small cell deployment. The system may comprise a memory storage and a processing unit coupled to the memory storage. The processing unit may be operative to capture access point data from an access point, transmit the access point data to a backend server, and receive, from the backend server, post-check results corresponding to the access point. The post-check results may be based on the transmitted access point data.

Another embodiment consistent with the disclosure may comprise a system for providing small cell deployment. The system may comprise a memory storage and a processing unit coupled to the memory storage. The processing unit may be operative to receive access point data, perform a post-check based on the received access point data, determine post-check results based on the performed post-check, and transmit the post-check results.

Yet another embodiment consistent with the disclosure may comprise a system for providing small cell deployment. The system may comprise a memory storage and a processing unit coupled to the memory storage. The processing unit may be operative to capture access point data, transmit the access point data, and receive, in response to transmitting the access point data, post-check results based on the transmitted access point data.

Figure 4:
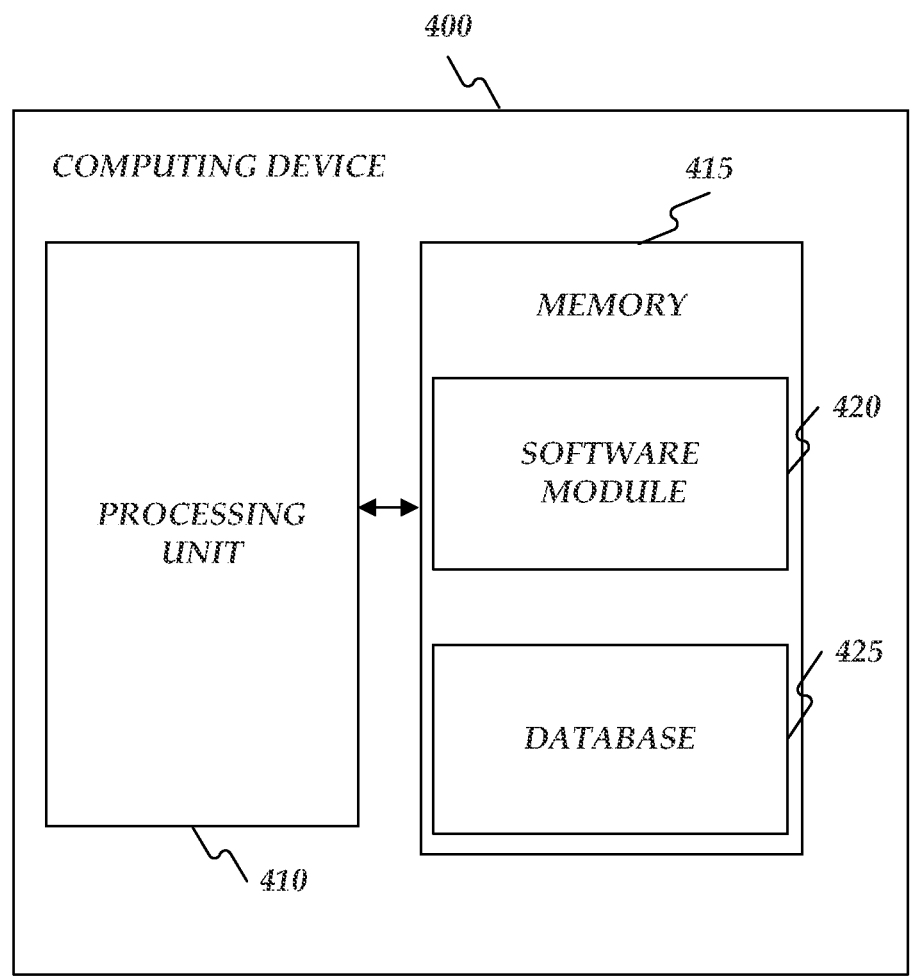
FIG. 4 shows a computing device.

FIG. 4 shows computing device 400 in more detail. As shown in FIG. 4, computing device 400 may include a processing unit 410 and a memory unit 415. Memory unit 415 may include a software module 420 and a database 425. While executing on processing unit 410, software module 420 may perform processes for providing small cell deployment, including for example, any one or more of the stages from method 300 described above with respect to FIG. 3. Computing device 400, for example, may provide an operating environment for technician device 105, backend server 110, deployment component 120, or network control component 125. Technician device 105, backend server 110, deployment component 120, or network control component 125 may operate in other environments and are not limited to computing device 500.

Computing device 400 ("the processor") may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a smart TV-like device, a network storage device, a network relay devices, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   capturing, by a technician device, access point data from an access point, the access point data comprising a Media Access Control (MAC) address of the access point, a serial number of the access point, model information of the access point, and a picture of an antenna associated with the access point, wherein capturing the access point data further comprises capturing the access data code from a bar code attached to the access point;
   transmitting, from the technician device, the access point data to a backend server, wherein transmitting the access point data comprises attaching a location information of the access point, the location information comprising a Global Positioning System (GPS) information corresponding to the location of the access point, wherein a control and provisioning of wireless access point (CAPWAP) tunnel is established for the access point with a wireless local area network (LAN) controller (WLC) based on the access point data and configuration information is downloaded from the WLC to the access point, and wherein a dynamic host configuration protocol (DHCP) leased established for the access point is validated based on the access point data; and
   receiving, by the technician device from the backend server, post-check results corresponding to the access point, the post-check results being based on the transmitted access point data, wherein the location information in the access point data and a radio coverage of the access point, after a confirmation of installation of the access point, is inserted into a topology map comprising a cell deployment area, and wherein the topology map is updated to provide real time progress information to indicate an amount of completion of the radio coverage of the cell deployment area.

2. The method of claim 1, wherein capturing the access point data from the access point comprises capturing the access point data from the access point comprising a Wi-Fi access point.

3. The method of claim 1, wherein capturing the access point data comprises reading a least one of the following: a radio-frequency identification (RFID) tag located on the access point, and data transmitted from the access point.

4. The method of claim 1, wherein capturing the access point data comprises capturing the access point data comprising at least one of the following: a serial number of the antenna, and model information corresponding to the antenna.

5. The method of claim 1, wherein capturing the access point data comprises capturing the access point data comprising a picture of the access point.

6. The method of claim 1, wherein capturing the access point data comprises capturing the access point data comprising a name of a technician who installed the access point.

7. The method of claim 1, wherein transmitting from the technician device comprises transmitting from the technician device comprising a mobile device.

8. The method of claim 1, wherein receiving the post-check results comprises receiving the post-check results indicating at least one action to be taken to improve deployment of the access point.

9. The method of claim 1, wherein receiving the post-check results corresponding to the access point comprises:
   receiving an indication that the access point is a defective access point;
   uninstalling the defective access point;
   installing a new access point to replace the defective access point;
   capturing the access point data for the new access point; and
   transmitting the captured data to the backend server.

10. An apparatus comprising:
    a memory storage; and
    a processing unit coupled to the memory storage, wherein the processing unit is operative to:
      receive access point data, the access point data comprising a Media Access Control (MAC) address of an access point, a serial number of the access point, model information of the access point, a picture of antenna associated with the access point, wherein the access point data is captured from a bar code attached to the access point, and wherein the access point data further comprises a Global Positioning System (GPS) information corresponding to a location of the access point;
      establish a control and provisioning of wireless access point (CAPWAP) tunnel for the access point with a wireless local area network (LAN) controller (WLC) based on the access point data,
      confirm that configuration information is downloaded from the WLC to the access point,
      validate a dynamic host configuration protocol (DHCP) lease established for the access point based on the access point data,
      perform a post-check based on the received access point data;
      determine post-check results based on the performed post-check;
      insert the location information from the access point data and a radio coverage of the access point, after a confirmation of installation of the access point, into a topology map comprising a cell deployment area,
      provide, based on updated the topology map, real time progress information to indicate an amount of completion of the radio coverage of the cell deployment area; and
      transmit the post-check results.

11. The apparatus of claim 10, wherein the processing unit being operative to receive the access point data comprises the processing unit being operative to receive the access point data comprising at least one of the following: a serial number of the antenna, model information corresponding to the antenna, and a name of a technician who installed the access point.

12. The apparatus of claim 10, wherein the processing unit being operative to perform the post-check comprises the processing unit being operative to perform the post-check comprising determining that there is a problem with how the access point was deployed.

13. The apparatus of claim 10, wherein the processing unit being operative to determine the post-check results based on the performed post-check comprises the processing unit being operative to determine the post-check results comprising information on how to fix a problem with how the access point was deployed.

14. The apparatus of claim 10, wherein the processing unit being operative to transmit the post-check results comprises the processing unit being operative to transmit the post-check results to a technician device comprising a mobile device associated with a technician who installed the access point.

15. The apparatus of claim 10, wherein the processing unit being operative to determine the post-check results comprises the processing unit being operative to determine the post-check results comprising instructions to adjust the antenna to a proper configuration.

16. A non-transitory computer-readable medium that stores a set of instructions which when executed perform a method executed by the set of instructions comprising:
   capturing access point data, the access point data comprising a Media Access Control (MAC) address of an access point, a serial number of the access point, model information of the access point, and a picture of an antenna associated with the access point, wherein capturing the access point data further comprises capturing the access data code from a bar code attached to the access point;
   transmitting the access point data, wherein transmitting the access point data comprises attaching a location information of the access point, the location information comprising a Global Positioning System (GPS) information corresponding to the location of the access point, wherein a control and provisioning of wireless access point (CAPWAP) tunnel is established for the access point with a wireless local area network (LAN) controller (WLC) based on the access point data and configuration information is downloaded from the WLC to the access point, and wherein a dynamic host configuration protocol (DHCP) leased established for the access point is validated based on the access point data; and
   receiving, in response to transmitting the access point data, post-check results based on the transmitted access point data, wherein the location information in the access point data and a radio coverage of the access point, after a confirmation of installation of the access point, is inserted into a topology map comprising a cell deployment area, and wherein the topology map is updated to provide real time progress information to indicate an amount of completion of the radio coverage of the cell deployment area.

17. The non-transitory computer-readable medium of claim 16, wherein capturing the access point data comprises capturing the access point data further comprising at least one of the following: a serial number of the antenna, and model information corresponding to the antenna.

18. The non-transitory computer-readable medium of claim 16, wherein capturing the access point data comprises capturing the access point data comprising a picture of the access point.

19. The non-transitory computer-readable medium of claim 16, wherein receiving the post-check results comprises receiving the post-check results indicating at least one action to be taken to improve deployment of the access point.

20. The non-transitory computer-readable medium of claim 16, wherein receiving the post-check results comprises receiving the post-check results comprising instructions to adjust the antenna to a proper configuration.

* * * * *